(12) United States Patent
Benkler et al.

(10) Patent No.: US 8,545,171 B2
(45) Date of Patent: Oct. 1, 2013

(54) ROTOR FOR A GAS TURBINE

(75) Inventors: Francois Benkler, Ratingen (DE); Ulrich Ehehalt, Essen (DE); Harald Hoell, Wächtersbach (DE); Uwe Kahlstorf, Mülheim a.d. Ruhr (DE); Karsten Kolk, Mülheim a.d. Ruhr (DE); Walter Loch, Mülheim an der Ruhr (DE); Peter-Andreas Schneider, Münster (DE)

(73) Assignee: Siemens Aktiengesellschaft, München (DE)

( * ) Notice: Subject to any disclaimer, the term of this patent is extended or adjusted under 35 U.S.C. 154(b) by 951 days.

(21) Appl. No.: 12/530,512

(22) PCT Filed: Feb. 15, 2008

(86) PCT No.: PCT/EP2008/051884
§ 371 (c)(1),
(2), (4) Date: Dec. 23, 2009

(87) PCT Pub. No.: WO2008/110431
PCT Pub. Date: Sep. 18, 2008

(65) Prior Publication Data
US 2010/0092293 A1 Apr. 15, 2010

(30) Foreign Application Priority Data
Mar. 12, 2007 (EP) .................................. 07005081

(51) Int. Cl.
*F01D 5/06* (2006.01)

(52) U.S. Cl.
USPC ................ 415/116; 415/60; 415/68; 415/175

(58) Field of Classification Search
USPC .................. 415/60, 63, 68, 69, 116, 119, 175, 415/199.5, 216.1, 229, 230; 416/124, 198 A
See application file for complete search history.

(56) References Cited

U.S. PATENT DOCUMENTS

| | | | |
|---|---|---|---|
| 2,751,765 A | 6/1956 | Rowland | |
| 3,230,710 A | 1/1966 | Bradley | |
| 3,395,949 A | 8/1968 | Kun | |
| 3,749,516 A | 7/1973 | Damratowski et al. | |
| 3,980,352 A | 9/1976 | Carlson | |
| 4,247,256 A | 1/1981 | Maghon | |
| 5,236,302 A | 8/1993 | Albrecht et al. | |
| 5,796,202 A * | 8/1998 | Herron et al. | 310/418 |
| 2003/0017878 A1 | 1/2003 | Muju et al. | |
| 2004/0007830 A1 * | 1/2004 | Uematsu et al. | 277/628 |
| 2005/0069411 A1 * | 3/2005 | Bast et al. | 415/199.5 |

FOREIGN PATENT DOCUMENTS

| | | |
|---|---|---|
| DE | 2729340 A1 | 1/1979 |
| FR | 2111096 A | 6/1972 |

(Continued)

*Primary Examiner* — Edward Look
*Assistant Examiner* — Aaron R Eastman

(57) ABSTRACT

A rotor of a thermal fluid flow machine, especially a gas turbine, is provided. The rotor includes a plurality of rotor components that are held together by a common tie-bolt that extends through the center of the rotor components. The tie-bolt is fixed in at least one of the rotor components using at least one star spring that surrounds the tie-bolt in a circumferential direction.

10 Claims, 2 Drawing Sheets

(56) References Cited

FOREIGN PATENT DOCUMENTS

| JP | 05001567 A | 1/1993 |
| JP | 8105489 A | 4/1996 |
| JP | 2000161002 A | 6/2000 |
| RU | 2230195 C2 | 6/2004 |

* cited by examiner

ROTOR FOR A GAS TURBINE

CROSS REFERENCE TO RELATED APPLICATIONS

This application is the US National Stage of International Application No. PCT/EP2003/051884, filed Feb. 15, 2008 and claims the benefit thereof. The International Application claims the benefits of European Patent Office application No. 07005081.0 EP filed Mar. 12, 2007, both of the applications are incorporated by reference herein in their entirety.

FIELD OF INVENTION

The invention refers to a rotor for a gas turbine according to the claims. It relates furthermore to a gas turbine with such a rotor.

BACKGROUND OF INVENTION

Gas turbines customarily have a rotatably mounted rotor which is enclosed by a fixed housing. The stationary subassemblies of the gas turbine are collectively also referred to as a stator. A flow passage, which extends in the axial direction, for a compressible flow medium is arranged between the rotor and the stator. Rotor blades, which project into the flow passage and are grouped together, forming blade rows, are customarily fastened on the rotor. The rotor blades on the compressor side serve for compressing a medium and on the turbine side serve for driving the rotor shaft by means of impulse transfer from a hot pressurized flow medium.

The rotating component of a gas turbine, which is also referred to as a rotor, for service-related reasons is customarily subjected to a high mechanical and thermal stress. In particular, the rotor components are heavily stressed as a result of the high temperature of the operating medium and as a result of the forces which act upon the rotor during operation of the gas turbine. In order to nevertheless be able to ensure the operational safety on the one hand and to keep the production costs of the rotor within acceptable limits on the other hand, a number of constructional possibilities for such turbine rotors were proposed in the past.

One of these constructional possibilities makes provision for also assembling the rotor of stationary gas turbines from individual rotor components, wherein the individual rotor components are held together via a tie-bolt. For this purpose, each rotor component has an axially extending recess through which the tensioned tie-bolt can extend. By means of threaded nuts which are screwed onto the tie-bolt at the end, this can be tensioned, as a result of which the rotor components, which abut against each other by their end faces, can be clamped to each other. The rotor components are then pressed against each other by the tie-bolt and transmit the rotational forces which act upon them via a so-called Hirth toothing which, disposed on the end face in each case, forms a form-fit between two abutting rotor components.

The rotor of the gas turbine is arranged in the housing of the turbine by means of suitable bearings at the ends. Instead of the threaded nuts, on the casing side more complexly designed components can also be screwed onto the end of the tie-bolt, which in addition to clamping the rotor components also enable further functions, such as the supporting of the rotor in a radial bearing and/or thrust nearing.

During operation of the gas turbine, however, vibrations occur in the rotor, the frequency of which inter alfa is dependent upon the spacing of the two thrust bearings, i.e. upon the freely vibrating length of the rotor and especially upon the freely vibrating length of the tie-bolt, in the case of such a type of construction. With increasing overall length of the gas turbine, the freely vibrating length of the tie-bolt also increases, which leads to its natural frequency being shifted to a lower level close to the rotational frequency.

SUMMARY OF INVENTION

In order to also be able to ensure the operational safety of the gas turbine in the case of increasing overall length, and also with respect to the customarily low natural frequency of the system, it is therefore necessary for the natural frequency especially of the tie-bolt to sufficiently lie above the operating speed.

For this purpose, U.S. Pat. No. 3,749,516 discloses a similarly built rotor of a twin radial compressor. The rotor which is known from this comprises a plurality of rotor disks and a centrally arranged hollow shaft. A tie-bolt extends centrally through the hollow shaft and through the rotor disks and by means of end pieces which are screwed on at the end tightly clamps the rotor disks and the hollow shaft to each other. In order to fix the tie-bolt in its position inside the rotor, provision is made on this tie-bolt for a sleeve with legs which are elastically fastened on the end and supported on the hollow shaft via a screw.

Furthermore, an only slightly vibratable tubular body is known from JP 08-105489 which inside is equipped with a vibration-suppressing structure which can rub against it. The vibration-suppressing structure in this case comprises a corrugated spring, via the corrugation crests of which a friction element is pressed onto the inner side of the tubular body. In order to enable the pressing-on, an annular retaining element which abuts against the corrugation valleys of the spring is provided.

Moreover, U.S. Pat. No. 5,236,302 shows an aircraft gas turbine with a tie-boltless rotor and a central cooling air guide pipe.

Furthermore, a vibration-damped tie-bolt is known from laid-open specification DE 27 29 340. For vibration damping, damping elements are arranged in the annular gap between tie-bolt and rotor disk in a uniformly distributed manner. Each damping element in this case is supported both on the tie-bolt and on the rotor disk which encompasses the damping element. At least one of the two contact faces of each damping element in this case lies on the rear side of a radial line of the rotor. As a result of this type of arrangement of the contact faces, a rotational moment acts upon the damping element owing to centrifugal force, which creates an inwardly directed centering force upon the tie-bolt via the damping element.

It would be desirable to keep the natural frequency of the tie-bolt sufficiently above the operating speed even with increasing overall length of the turbine. Therefore, on the one hand the operational safety of the turbine would be ensured, and on the other hand the increasing power requirement, for the coverage of which an extension of the overall length of the gas turbine is necessary, could consequently be met.

The invention is therefore based on the object of disclosing a rotor of the type referred to in the introduction, which ensures a safe operation of the gas turbine even in the case of increasing overall length. Furthermore, the vibration amplitudes of the tie-bolt are to be kept as low as possible especially in the region of the hollow shaft which is located in the center section.

This object is achieved according to the invention by means of a rotor according to the claims. For the rotor which is referred to in the introduction it is proposed that the tie-bolt, in the axial section of the hollow shaft, is fixed via at least one star spring which extends round in the circumferential direction and is supported on the nearest outer rotor component.

The invention in this case starts from the consideration that just for achieving a high overall rigidity of the rotor some of the rotor components should also be especially rigidly connected to the tie-bolt, wherein the thermally-induced different expansions of the rotor components should therefore be kept compensatable. In particular, the fact should be taken into account that owing to increasing requirements with respect to the output of the gas turbine its length increases, as a result of which the natural frequency of the tie-bolt approximates to the operating speed of the gas turbine. For avoiding the approximation, the tie-bolt should be suitably supported at several axial positions in order to increase its rigidity. The supporting of the tie-bolt should be carried out at least at one axial position at which impermissibly high vibration amplitudes can occur. This is the case in the region of the hollow shaft which is located between compressor-side rotor section and turbine-side rotor section. For compensating expansion effects and also for ensuring the desired supporting action, the star springs are consequently provided in the region of the hollow shaft which on the one hand can react in a passively suitable manner to expansion effects in the manner of an especially flexible system, and which on the other hand, in reaction to the centrifugal forces which occur during rotation, also directly avoid an impairment of the supporting action which is induced as a result. The support springs in this case abut against the nearest outer disposed rotor component, apart from the support springs themselves. The rotor component can be the hollow shaft itself, or also a cooling air separation pipe which is arranged between hollow shaft and tie-bolt.

For cooling purposes and especially for guiding a cooling air flow, a number of coaxially extending cooling-air separation pipes, which encompass the tie-bolt, are advantageously provided especially in the region of the center hollow shaft of the gas turbine.

The tie-bolt in this case is encompassed by the cooling-air separation pipes which in their turn in a further advantageous development can be spaced apart from each other in each case by means of star springs which extend in the circumferential direction. In this way, the tie-bolt is supported in a number of cooling-air separation pipes, wherein the outermost cooling-air separation pipe, as seen in the radial direction, is also fixed with a star spring in the axially extending recess of the rotor.

The advantages which are achieved with the invention are particularly that as a result of supporting the rotor components with respect to the tie-bolt by means of the star springs, a safe operation of the gas turbine is made possible, even with increasing overall length. In particular, by increasing the rigidity of the rotor the vibration amplitudes can be kept especially low. Moreover, the system for increasing the rigidity of the rotor by means of clamping the rotor components with the tie-bolt with only comparatively little expenditure, especially on account of the comparatively simple installation, the low weight and the low costs, can be realized. Furthermore, by means of a system which is formed in such a way the thermally-induced relative movements between the rotor components and the tie-bolt can be compensated particularly well. At the same time, however, cooling which is necessary on account of the high thermal stress of the rotor components is also ensured by means of a cooling air duct which extends in the axial direction of the rotor.

BRIEF DESCRIPTION OF THE DRAWINGS

An exemplary embodiment of the invention is explained in more detail with reference to a drawing. In the drawing.

Like components are provided with the same designations in the two figures.

DETAILED DESCRIPTION OF INVENTION

Figure 1:
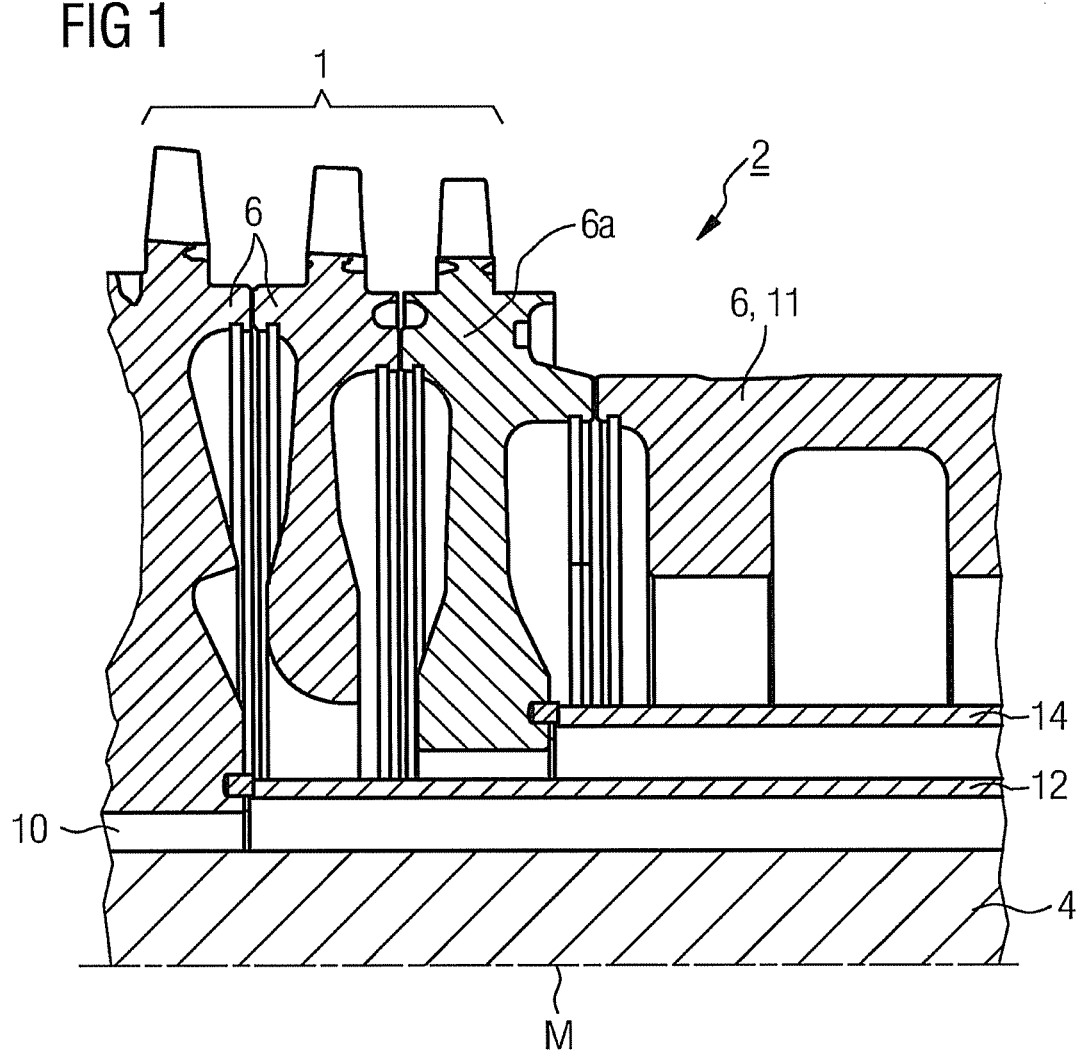
FIG. 1 shows a sectional view of a turbine rotor with a tie-bolt.

A rotor 2 of a gas turbine, which is not shown in more detail, with a number of individual rotor components 6, which are held together by means of a tie-bolt 4 and joined together, forming a unit, is shown as a detail in FIG. 1 in a longitudinal section.

The rotor 2 in this case has a compressor-side section 1 and a turbine-side section, which is not additionally shown, with a number of rotor components 6 in each case. The rotor components 6 on the connecting side, i.e. on the end face, are provided with recesses which extend symmetrically to the center axis M of the rotor 2, wherein the contours which are created as a result are formed in a mariner corresponding to the contours of the respective adjacent rotor component 6, as a result of which a concentric alignment of the rotor components 6 to the center axis M is brought about.

Each of the rotor components 6, for the spaced passage of the tie-bolt 4, is provided with an axially extending, centrally disposed bore 7. In the illustration according to FIG. 1, three rotor components 6, which are formed as rotor disks, of the compressor-side section 1 of the rotor 2 are shown. In this case, that compressor-side rotor component which is the nearest facing the turbine-side section is designated 6a. On the end face, a center hollow shaft 11 abuts against the rotor component 6a. Radially further inwards, moreover, two cooling-air separation pipes 12, 14 are provided. At the ends, the tie-bolt 4 is screwed to a rotor component 6 in each case, as a result of which all rotor components 6 which are arranged in between are held together and clamped. The recesses which are located between the rotor components 6 in this case serve for guiding a cooling medium for cooling the rotor components by cooling air being fed via a cooling passage which is formed between the tie-bolt 4 and rotor component 6.

The rotor 2 is designed for a particularly high inner rigidity. Consequently the effect is especially to be achieved of the natural frequencies of the rotor being able to be kept sufficiently far above the operating speed of the gas turbine, even with an overall length of the rotor 2 which is selected comparatively large. Consequently, vibration amplitudes and resonance effects which occur are to be kept sufficiently low in order to ensure a high operational safety of the turbine in any event.

Figure 2:
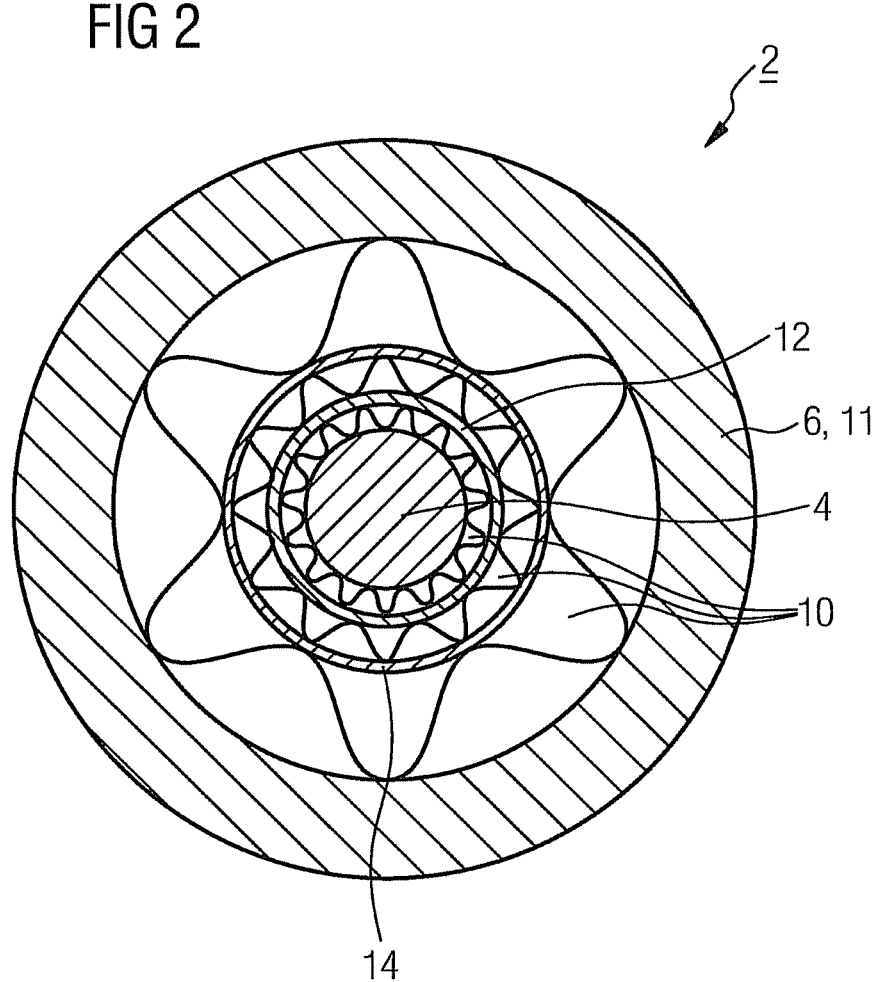
FIG. 2 shows the central region of the turbine rotor according to FIG. 1 in cross section.

In order to ensure the desired rigidity of the rotor 2, the tie-bolt 4 is supported, for example indirectly, via a number of star springs 10 with respect to the rotor components, as is shown in cross section of the central region in FIG. 2. A direct supporting of the tie-bolt 4 on the rotor component 6 via only a single star spring 10 is also possible in this case. The star springs 10 in this case are designed for creating a reliable mechanical contact between the tie-bolt 4 and the encompassing rotor component 6, even when thermal expansion effects occur, wherein, moreover, as rotor speed increases the rigidity of the system and the supporting action are to be further increased.

As can be especially gathered from the view in FIG. 2, a multiplicity of star springs 10 in the manner of a multilayered type of construction is possible, and the axial length of which is determined depending upon requirement. In this case a first star spring 10, which is supported on the outside on the inner side of an inner cooling-air separation pipe 12 which encompasses the tie-bolt 4, encompasses the tie-bolt 4 in the manner of a first layer. The inner cooling-air separation pipe 12 in its turn is encompassed on the outside by a further star spring 10 which in its turn is supported on the outside on the inner side of an outer cooling-air separation pipe 14 which encompasses the inner cooling-air separation pipe 12. This is also again encompassed by a star spring 10 which is now supported on the outside on the inner side of the central bore of the respective rotor component 6, for example of a center hollow shaft.

As a result of this type of construction it is ensured that with a simple type of construction, low weight and low installation and production cost, expansion effects and centrifugal force effects can be effectively compensated and a reliable mechanical contact between the tie-bolt 4 and the encompassing components can be maintained. Furthermore, this system acts in a self-centering manner for the tie-bolt 4. When using the star springs 10, temperature-induced expansion effects result, moreover, in an increase of the mechanical contact and therefore in increasing rigidity of the construction.

The invention claimed is:

1. A rotor for a gas turbine, comprising:
    a compressor-side section;
    a turbine-side section;
    a first plurality of individual rotor components located in the compressor-side section;
    a second plurality of individual rotor components located in the turbine-side section;
    a common tie-bolt; and
    a hollow shaft,
    wherein the first plurality of individual rotor components and the second plurality of individual components are held together using the common tie-bolt which is freely guided through a center of the plurality of rotor components,
    wherein the hollow shaft encompasses the tie-bolt leaving a clearance and is located between a compressor-side rotor component which is arranged nearest to the turbine-side section and a turbine-side rotor component which is arranged nearest to the compressor-side section, and
    wherein the tie-bolt is fixed in an axial section of the hollow shaft via a star spring which extends around in a circumferential direction and which is supported on a nearest outer rotor component.

2. The rotor as claimed in claim 1, wherein an outer rotor component is the hollow shaft or a cooling-air separation pipe.

3. The rotor as claimed in claim 1,
    wherein at least one cooling-air separation pipe is arranged inside the hollow shaft coaxially to the tie-bolt, and
    wherein a star spring is arranged between the tie-bolt and an inner cooling-air separation pipe.

4. The rotor as claimed in claim 3, wherein the cooling-air separation pipe is fixed in a plurality of places via the star spring which encompasses the cooling-air separation pipe in the circumferential direction.

5. The rotor as claimed in claim 4, wherein a plurality of star springs are used in a multilayered construction whereby a first star spring is arranged between the tie-bolt and the inner cooling-air pipe which encompasses the tie-bolt, a second star spring is arranged between the inner cooling-air pipe and an outer cooling-air pipe which encompasses the inner cooling-air pipe, and a third star spring is arranged between the outer cooling-air pipe and the hollow shaft.

6. A gas turbine, comprising:
    a rotor, comprising
        a compressor-side section,
        a turbine-side section,
        a first plurality of individual rotor components located in the compressor-side section,
        a second plurality of individual rotor components located in the turbine-side section,
        a common tie-bolt, and
        a hollow shaft,
    wherein the first plurality of individual rotor components and the second plurality of individual components are held together using the common tie-bolt which is freely guided through a center of the plurality of rotor components,
    wherein the hollow shaft encompasses the tie-bolt leaving a clearance and is located between a compressor-side rotor component which is arranged nearest to the turbine-side section and a turbine-side rotor component which is arranged nearest to the compressor-side section, and
    wherein the tie-bolt is fixed in an axial section of the hollow shaft via a star spring which extends around in a circumferential direction and which is supported on a nearest outer rotor component.

7. The gas turbine as claimed in claim 6, wherein an outer rotor component is the hollow shaft or a cooling-air separation pipe.

8. The gas turbine as claimed in claim 6,
    wherein a cooling-air separation pipe is arranged inside the hollow shaft coaxially to the tie-bolt, and
    wherein a star spring is arranged between the tie-bolt and an inner cooling-air separation pipe.

9. The gas turbine as claimed in claim 8, wherein the cooling-air separation pipe is fixed in a plurality of places via a star spring which encompasses the cooling-air separation pipe in the circumferential direction.

10. The gas turbine as claimed in claim 9, wherein a plurality of star springs are used in a multilayered construction whereby a first star spring is arranged between the tie-bolt and the inner cooling-air pipe which encompasses the tie-bolt, a second star spring is arranged between the inner cooling-air pipe and an outer cooling-air pipe which encompasses the inner cooling-air pipe, and a third star spring is arranged between the outer cooling-air pipe and the hollow shaft.

* * * * *